United States Patent Office 3,274,164
Patented Sept. 20, 1966

3,274,164
POLYMERIZABLE SUBSTITUTED - 4 - PENTENAM-
IDE MONOMERS, POLYMERS THEREOF, AND
METHODS FOR MAKING AND USING THESE
COMPOSITIONS
Melvin D. Hurwitz, Southampton, Pa., assignor to Rohm
& Haas Company, Philadelphia, Pa., a corporation of
Delaware
No Drawing. Filed July 5, 1963, Ser. No. 293,582
14 Claims. (Cl. 260—78.5)

This invention is concerned with novel compositions comprising highly reactive functional monomers which are capable of addition polymerization to produce valuable thermosettable polymers and of reaction with other substances having complementally reactive groups to form modified substances having advantageous properties adapting them to special uses. The invention is particularly concerned with compositions of reactive and/or thermosetting character adapted for use for impregnating, coating, and molding purposes.

The monomeric compounds of the present invention are those of the formula

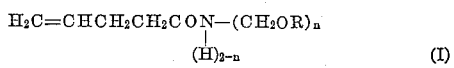

(I)

wherein R is selected from the group consisting of H and alkyl having 1 to 18 carbon atoms, and $n$ is a number having an average value of about 0.8 to 2.0 and preferably having an average value of about 1.

The monomer in which R is H may be made by reacting 4-pentenamide with formaldehyde or a source of formaldehyde such as paraformaldehyde at a temperature of about 20° C. to 90° C., preferably about 30 to 60° C., in an aqueous medium, or an organic medium, such as an alcoholic medium, containing either an acid or an alkaline catalyst. Preferably, an alkaline catalyst is used, such as an alkali metal hydroxide or carbonate, of which sodium carbonate may be of typical practicality, the pH being from about 7.5 to 10. The proportion of formaldehyde may be from about 0.8 mol to 2 mols or higher even up to 4 mols, all based on one mol of the pentenamide. The product is water-soluble and can be isolated, at least partly, to provide a composition within the formula defined, such as the N-monomethylol-4-pentenamide, by careful dehydration under vacuum, by salting-out with selected solvents, and/or crystallization. For most purposes, however, isolation of the condensation obtained from the pentenamide and formaldehyde is unnecessary, and merely adds to the expense involved.

The monomers of the formula in which R is an alkyl group may be prepared by carrying out the reaction with the formaldehyde in an aqueous or an organic solvent medium containing at least one alcohol, the amount of water being relatively small, such as 15% or less of the solvent medium. The amount of alcohol used may be at least about 0.8 mol to 2 mols per mol of pentenamide. Excess alcohol up to 10 or more mols per mol of the amide may be present. A part of the alcohol generally remains unreacted with the N-methylolamide and serves as part of the solvent medium containing the product dissolved therein. When making the alkylated derivatives in this fashion, the reaction medium is adjusted to an acid pH, such as 2 to 5, at least during the latter portion of the reaction, if the initial methylolation is not carried out on the acid side. Any suitable acid may be used, such as sulfuric, hydrochloric or other strong mineral acid or an organic acid, such as a lower fatty acid, e.g. formic, acetic, citric, tartaric or a dicarboxylic acid such as oxalic acid, etc. and acid ion-exchange resins. Potentially acidic tertiary amine salts of any of the acids so far mentioned, e.g., the hydrochloride of 2-methyl-2-amino-propanol-1, triethylamine monomaleate, etc.

Instead of having the alcohol present even at the start of the methylolation, it may be added to the product of the methylolation and the alkylation may then be carried out over a wide pH range, preferably at a pH of 2 to 4.5.

The product may consist of the alkylated methylolamide in which the entire methylol component is converted to alkoxymethyl or it may include a mixture of N-methylol amide and N-alkoxymethylamide, and, if desired, the alkyl component of the alkoxymethyl group may be derived partly from one alcohol and partly from one or more other alcohols.

The alcohol may be methanol, ethanol, isopropanol, 2-ethylhexanol, dodecanol, octadecanol, or any other primary or secondary alcohol having 1 to 18 carbon atoms, and, of course, a mixture of two or more such alcohols may be used. In general, the N-methoxymethyl and N-ethoxymethyl products are highly water-soluble but the solubility diminishes sharply as the alcohol increases in size from 3 to 18 carbon atoms.

The monomers are useful as intermediates for modifying other materials containing a complementally reactive group. For example, they react with hydroxyl-containing materials, such as cellulose, starch, and cellulose esters and ethers which have not been completely esterified or etherified, and with amide-containing materials, such as polyamide nylons, wool, silk, casein, or other proteinaceous materials. Reaction with these materials may be resorted to for various purposes; e.g. to stiffen the materials; to crease-proof or render wrinkle-resistant such materials, especially cotton, rayon, and nylon; to reduce shrinkage and to stabilize against shrinkage such materials as wool, cotton, and rayon; to render any of such materials water-resistant and/or water-repellent, and/or to lubricate them, especially by applying the more hydrophobic compositions. As compared to acrylamide, methacrylamide and their N-methylolated and-alkoxymethylated derivatives, the monomers of the present invention do not undergo the Michael addition reactions with water, alcohols, amines and the like under alkaline conditions. They are less toxic and more stable thermally; they usually need no polymerization inhibitor under normal storage conditions; and they involve fewer and/or less difficult problems in manufacturing and handling than the analogous acrylamides or methacrylamides mentioned heretofore.

Illustrative of this general type of use, cellulose material, in the form of fibers, filaments, woven or knitted fabrics or carded webs, or other fabricated structures, is impregnated with a solution containing 5% to 25% of a monomer of the present invention and then the treated fabric is subjected to conditions under which the monomer is polymerized by vinyl addition (that is, at the double bond) and also reacted with hydroxyl groups in the cellulose molecule. This may be accomplished by including within the impregnating solution used to apply the monomer, or by applying to the fabric before or after such impregnation, a free-radical initiator for the addition polymerization of the monomer which is of acidic character such as ammonium persulfate or, if not acidic, the initiator (such as tert-butyl hydroperoxide) is accompanied by an acid such as any of those mentioned hereinbefore. In this manner, the amide monomer penetrates the cellulose material and polymerizes to provide a long-chain molecule which at numerous positions becomes attached to the cellulosic molecules by means of ether linkages resulting from the reaction of the methylol groups in the amide polymer with the hydroxyl groups of the cellulose. Alternatively, the monomer may be polymerized by vinyl addition, using a free-radical initiator before or after reaction is effected with the cellulose through the methylol groups. However, the simultaneous or one-step operation is preferred and is generally more efficient for a given amount of monomer. By this procedure cellulose materials can have their resistance to creasing so greatly enhanced that crease-recovery angles as high as 145° or more are readily obtained. In addition, the loss in tensile strength as the result of chlorination followed by drying and ironing is markedly reduced as compared to that obtained if the monomer were merely reacted with the cellulose molecule by means of an alkaline catalyst.

To accomplish crease-proofing, 1% to 25% by weight, based on cellulose, of the monomer of the present invention may be added directly to a cellulosic spinning solution, such as viscose or cuprammonium cellulose, and the spinning is carried out in the same way as is disclosed in the U.S. Letters Patent of Allewelt 3,093,446, and the disclosure thereof is incorporated herein by reference.

The monomers of the present invention may be homopolymerized, copolymerized with each other, or at least one of such monomers may be copolymerized with at least one other copolymerizable ethylenically unsaturated monomer, especially one having a terminal unsaturated group of the formula $H_2C=C<$. Polymers containing as little as 0.25% by weight, and sometimes even less, of a monomer of the present invention are quite useful as coating and impregnating resins or as molding resins by virtue of the reactivity of the N-substituted amide groups which impart the capacity of the polymers to be thermoset to insoluble and non-thermoplastic condition during the formation of molded articles therefrom or on heating impregnations or coatings made therewith.

The compounds of Formula I may be polymerized or copolymerized in bulk, in solution, or in either an emulsion or suspension technique to produce various types of polymers including the granular type. Solution polymerization may be effected in such solvents as water, dimethylformamide or other of the solvents mentioned above in which the compounds of Formula I and any comonomers that may be used are suitably soluble. Although some of the compounds of Formula I have generally an appreciable solubility in water, all of these compounds of Formula I may be copolymerized with water-insoluble monomers by an emulsion technique in which the comonomers and any excess of the compound of Formula I over the amount that is soluble in the water are emulsified by non-ionic, cationic, or anionic emulsifiers or suitable mixtures thereof.

The polymerization is effected with the aid of a free radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.5% to 1% of the initiator. Examples of oragnic peroxide catalysts that may be used include benzoyl peroxide, acetyl peroxide, apropyl peroxide, butyl perbenzoate, butyl hydroperoxide. Examples of azo catalysts include azodiisobutyronitrile, azodiisobutyramide, dimethyl or diethyl or dibutyl azodiisobutyrate, azobis($\alpha,\gamma$-dimethylvaleronitrile), azobis($\alpha$-methylvaleronitrile), azobis($\alpha$-methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those state above. The peroxide catalyst is effectively coupled with a reducing agent such as an alkali metal sulfite, bisulfite, or metabisulfite, or hydrosulfite, or hydrazine. The action of the redox system may be controlled through use of a chain transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble after which the suspension or slurry may be filtered or decanted and the polymer washed. Alternatively, the solvent may be distilled to leave the polymer.

In the case of emulsion polymerization, examples of suitable non-ionic emulsifiers include the higher alkyl phenoxypolyethoxyethanols in which the alkyl group has from 6 to 18 carbon atoms, such as octyl, dodecyl or octadecyl, and there may be from 8 to 50 or more oxyethylene units. Examples of anionic emulsifiers include the higher fatty alcohol sulfates, such as sodium lauryl sulfate, examples of cationic emulsifiers include higher alkyl pyridinium salts such as lauryl pyridinium chloride, (octylbenzyl)-trimethylammonium chloride, and so on.

Examples of vinylidene or monoethylenically unsaturated compounds that may be copolymerized with the compound of Formula I include acrylonitrile, methacrylonitrile, acrylic and methacrylic acids, their esters, amides and salts, itaconic acid and its functional derivatives, particularly its esters, maleic anhydride or maleic and fumaric acids and their esters, vinyl ethers and esters, vinyl sulfides, styrene, vinyltoluene, and allyl esters of monocarboxylic acids. Specific vinylidene compounds are methyl, ethyl, isopropyl, butyl, tert-butyl, octyl, dodecyl, octadecyl, octenyl, or oleyl acrylates or methacrylates or itaconates, dimethyl maleate or fumarate, diethyl maleate, diethyl fumarate, diethyl citraconate, diethyl chloromaleate, tert-butylaminoethyl acrylate or methacrylate, acrylamide, methacrylamide, N-methylacrylamide, N-butylmethacrylamide, hydroxyethyl vinyl ether, octyl vinyl ether, dodecyl vinyl ether, ureidoethyl vinyl ether, ureidoisobutyl vinyl ether, ethyl vinyl ether, butyl vinyl ether, butyl vinyl sulfide, methyl vinyl sulfide, dodecyl vinyl sulfide, vinyl acetate, vinyl propionate, vinyl laurate, vinylidene chloride, vinyl chloride, N-methylolacrylamide, $\beta$-hydroxyethyl acrylate, isobutylene, $\alpha$-methylstyrene, p-methylstyrene, p-chlorostyrene, vinylnaphthalene, etc. When two or more free radical-polymerizable vinylidene groups occur, as in divinylbenzene, trivinylbenzene, ethylene diacrylate or methacrylate, bis(vinyloxyethyl)urea, or vinyloxyethyl acrylate or methacrylate, insoluble interpolymers result.

The polymers of the present invention may also be made by homopolymerizing or copolymerizing 4-pentenamide and then reacting the resulting polymer with formaldehyde in aqueous medium which may contain one or more alcohols or consist largely of the alcohols in which the polymer is dissolved. The pH and temperature conditions used are generally the same as in the preparation of the monomers of Formula I. Again, the N-methylolated 4-pentenamide may be polymerized and the resulting homopolymer or copolymer may be alkylated by dissolving it in an alcohol mixture which is acidified, preferably to a pH of 2 to 4.5 and then heated to reflux with removal of water of condensation.

The homopolymers may be used in admixture with other materials, such as starch, gelatin, or plasticizers therefor to provide coatings or films, thickening materials, warp sizes or the like. The homopolymers with other film-forming materials, such as vinyl and acrylic resins, may be pigmented or dyed to provide decorative coatings on substrates, such as textile, leather, paper, wood, or on metal or glass surfaces.

Copolymers containing from about ¼ to 10% by weight of the compounds of Formula I are particularly valuable in the production of coating materials either in the form of emulsion polymers or solution polymers, the latter being used as lacquers or enamels. The aqueous emulsion dispersions of such copolymers are adapted to be used as water-base paints or to be included in alkaline spinning solutions, such as cuprammonium cellulose or viscose solutions, to modify the dyeing characteristics and the moisture-retention characteristics. Copolymers containing about ½ to 10% of a compound of Formula I with methyl methacrylate or other acrylic acid or methacrylic acid esters or mixtures thereof can be produced in organic solvent solutions such as in xylene and butoxyethyl acetate or mixtures thereof and used as lacquers which are characterized by outstanding adhesion toward a wide variety of substrates including bare and primed metals, such as bare cold rolled steel, aluminum, and brass and other substrates, such as glass, asbestos-cement shingles, wood, leather, paper, and textile.

Copolymers containing about 1 to 10% by weight of a compound of Formula I with ethyl acrylate, butyl acrylate, or the like, are useful as binders for non-woven fabrics and to reduce the shrinkage of wool. For these purposes, they may be applied in aqueous dispersions of a concentration from 10% to 30% or more so that from about 5% to 15% or even up to 150% by weight of the copolymer is deposited on the fabric. After drying, the treated fabric may be heated to 240° F. to 350° F. for a period of one-half to fifteen minutes. Similar aqueous dispersions made by the emulsion copolymerization of a monomer of Formula I with acrylic esters and especially butyl acrylate or ethyl acrylate are useful, with or without pigment, for the primary coating of leather. In this connection, the —$CH_2OR$ group apparently exerts some chemical bonding action with the structure of the leather so as to provide good adhesion.

The copolymers may be applied as hot-melt coatings. They may be applied as solutions in such organic solvents as toluene, xylenes, n-butanol, dimethylformamide, or mixtures thereof. If desired, the copolymers may be initially prepared in the solvent by which they are intended to be applied in coating, impregnation, and the like. Again, the copolymers may be applied as aqueous dispersions obtained by emulsion copolymerization.

Aqueous dispersions of water-insoluble copolymers of the present invention are especially useful. The copolymer dispersions thereby obtained may be employed directly with or without dilution with water for the coating of such materials as paper, leather, textiles, ceramics, and metals which may be either bare or primed with known commercial primers. They may also be employed for the coating of stone, cement, concrete, bricks, asbestos cement shingles, cinder bock, and other masonry surfaces which are ordinarily subjected to moist conditions during use for the purpose of providing water-resistant coatings thereon. Such coatings serve to prevent the leaching of calcium, magnesium, and other salts normally present in the cementitious types of products which ordinarily cause efflorescence, that is, the formation of a white disfiguration or discoloration at the surface of the products on wetting.

In general, the aqueous dispersions or organic solvent solutions of the copolymers may be employed as a clear composition to provide a thin, clear, glossy transparent coating of highly decorative nature. If desired, however, dyes, fillers, or pigments can be included, the amount varying in dependence upon the particular purpose for which the composition is intended, to prepare water-base paints or like compositions. Examples of water-insoluble pigments which may be used include azo pigments and lakes, phthalocyanine pigments, vat dyestuffs in their water-insoluble form, and inorganic pigments such as carbon black, iron oxides, chrome yellows, titanium dioxide, and lithopone. Powdered or flaked metals may also be included, such as aluminum, bronze, brass, chromium, or gold. Mixtures may be used, if desired. The proportion of pigment used may vary from about 5 to 100% by weight, based on the weight of the copolymer.

When the copolymers in the form of aqueous latices, dispersions, or so-called "emulsions," are intended for coating or impregnating paper, textiles, leather, or other flexible materials, they should have an apparent second order transition temperature, $T_i$, which is not over 20° C. such as from about —40° C. to 20° C.; though, for other purposes, copolymers having a $T_i$ up to 150° C. may be used.

The $T_i$ value referred to herein is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$.

The aqueous dispersions, or solutions in organic solvents, of the water-insoluble copolymers of the present invention may be used for the stabilization of wool fabrics against shrinkage on washing, as water-repellent for fabrics, as binders for the fibers in non-woven fabrics, and as backcoatings for various types of fabrics, such as pile fabrics, especially those intended to be used for rugs, giving body to the fabrics and preventing ravelling.

The polymers of the present invention provide good adhesion to cellulosic fibers and synthetic fibers of nylon and acrylonitrile polymers. Non-woven webs bonded therewith exhibit excellent resistance to discoloration and stiffening on exposure to heat and ultraviolet light. The polymers are excellent for impregnating and unifying the fibrous backings used in making masking tapes, imparting thereto stability against solvents.

The polymers of the invention are useful for backing woven fabrics, and especially pile fabrics, used in upholstery. The cross-linking obtained on thorough curing can, in this setting, significantly increase the tensile strength of the film and backed structure as a whole, and it can substantially improve the seam strength thereof, depending on the particular construction of fabric and the amount of polymer applied. The polymers of the present invention are especially useful in the production of backed fabrics in that they can be applied before dyeing. Because of their capability of being cured to a highly cross-linked condition, and backed fabrics can be readily dyed thereafter without disturbing the backing.

The compositions are particularly useful in the preparation of pigment-printing and pigment-dyeing compositions for application to textile fabrics.

In all of the uses to which the polymer coatings formed of the preferred compositions of the invention are put, they can insolubilized and thereby rendered quite durable, either by drying with or without aging at room temperature, by prolonged subjection to the normal atmosphere in high temperature climates, or by heating the articles coated or impregnated with the polymer coatings described herein to a temperature of 200° F. to 750° F. or higher for periods of time from a few seconds at the higher limit of the temperature range mentioned up to an hour or more at the lower portion thereof. Temperatures of 290° to 310° F. for 10 to 20 minutes are quite satisfactory. An acidic catalyst to accelerate this insolubilization may be included as described hereinafter. The insolubilization or thermosetting quality may be modified, if desired, by coreaction with a polyfunctional reagent, such as a polyisocyanate, a polyepoxide, or a thermosetting aminoplast condensate. Thus, for example, the aqueous coating compositions formed of these copolymer dispersions may be modified by the addition of a small proportion of certain water-soluble or self-dispersible urea-formaldehyde, N,N'-ethyleneureaformaldehyde, and aminotriazine-formaldehyde condensates as well as an acidic catalyst. Thus, penta-methylol or hexa-methylol melamine or a methylated penta-methylol or hexamethylol melamine condensate obtained by etherification with methyl alcohol may be used. The proportion of condensate used is from one-twentieth to one-third of the weight of copolymer. Preferably, the condensate is employed at about 10 to 20% by weight of the copolymer.

The modified coating compositions may simply be obtained by the dissolution of the polyfunctional reagent, such as the formaldehyde condensate, within the aqueous dispersion of the emulsion copolymer prepared as indicated above. In addition, an acidic catalyst is preferably also dissolved in the aqueous dispersion of the copolymer and condensate.

As stated, the aqueous coating composition may contain a small proportion, ranging from about 0.1% to 2% by weight of the aqueous composition, of an acidic catalyst to accelerate the condensation of the coating to insoluble and infusible condition. By "insoluble," at this point, is meant insolubility not only in water but in organic solvents in general. Examples of the acid catalyst are oxalic acid, ammonium phosphate, ammonium thiocyanate, boron trifluoride ethyl etherate, hydrochloric or other acid salts of a hydroxyaliphatic amine, including 2-methyl-2-amino-propanol, 2-methyl-2-amino-1,3-propandiol, tris(hydroxymethyl)aminomethane, 2-phenyl-2-amino-1-propanol, 2-methyl-2-amino-1-pentanol, 2-amino-butanol, triethanolamine, and 2-amino-2-ethyl-1-butanol, also ammonium chloride, pyridine hydrochloride, and benzyldimethylamine oxalate. The amine salts are water-soluble latent catalysts substantially neutral at ordinary temperature but dissociate into volatile components, one of which is acidic at the elevated temperatures used for baking and curing, so that the catalyst, after exerting its accelerating effect, is automatically discharged during the heating or curing stage.

In addition to the other ingredients, the aqueous dispersions may contain a water-soluble thickening agent, such as gum tragacanth, water-soluble cellulose ethers, polyvinyl alcohol or partially saponified polyvinyl acetate, or copolymers of 30 to 60% of acrylic or methacrylic acid with 70 to 40% of ethyl or methyl acrylate. The aqueous dispersions may contain a mild alkali, for example, sodium acetate, sodium carbonate, chalk, morpholine, N-methylmorpholine, triethylamine, or ammonia, including, if desired, a mixture of water-soluble substances which form a conventional mildly alkaline buffer. The proportions of the several ingredients in the aqueous dispersions can be varied widely, and they are adjusted in any convenient manner so that the dispersions or pastes have a consistency suitable for application by the particular technique to be employed for this purpose.

After application of the thermosetting coating or impregnating compositions of the present invention to whatever substrate is involved, the coated or impregnated material is dried, either by simple exposure to the ambient atmosphere or by being subjected to elevated temperatures such as up to 140° to 180° F. Thereafter, the coated material may be subjected to a baking or curing operation involving the subjection thereof to a temperature from about 240° F. up to 750° F. for a time which is inversely proportional to the temperature. For example, at the lower range of temperature, the time may be from three-fourths of an hour to somewhat over an hour, such as 1¼ hours, in duration; whereas, at the upper portion of the temperature range, the time may be on the order of ten seconds to five minutes in duration. In an intermediate preferred range of about 290° to 310° F., a time period of about 10 minutes to 20 minutes may be employed. The heating operation serves to render the coating composition insoluble in organic liquids, as well as water, and also infusible. The upper limit of temperature and its duration should be so selected and correlated as to avoid decomposition or other damage to the coated or impregnated article. In some cases, insolubilization can be obtained by aging at room temperature without need for a heating step.

The compositions may be applied to the substrates in any suitable manner such as by spraying, brushing, roller-coating, dipping, knife-coating, and so on. Excess of the applied material may be wiped by any suitable squeegeeing operation such as between pressure rollers, by air squeegeeing, or by a knife or doctor blade. Thereafter, the coating may be dried and cured as stated hereinabove. Besides simple air-drying, there may be employed for this purpose heated air as in an oven or tunnel drier, radiation such as by infra-red lamps, or electrical induction, either of electromagnetic or electrostatic high frequency induction fields. The baking or curing operation may be accomplished by the use of any suitable heating devices such as infra-red lamps or electromagnetic or electrostatic high frequency induction devices.

When the coating compositions are applied to substrates having reactive groups, such as paper or textiles formed of cellulosic or proteinaceous fibers, it is believed that the substrate takes part in the reaction during curing and baking so that the copolymer (and the formaldehyde condensate, or polyisocyanate, or polyepoxide, if present) and the substrate are combined chemically, whereby outstanding adhesion, durability, and resistance to water, washing, laundering, and solvents, including those used for dry-cleaning, such as perchloroethylene, carbon tetrachloride, and solvent naphthas, are obtained.

The present invention provides novel thermosetting copolymers which combine the qualities of efficiency and economy. The amide component even in a small total amount of 0.5 to 4.5% by weight of the copolymer provides a higher efficiency of cure, in terms of temperature and time for a given catalyst system, than can be obtained from a similar copolymer lacking the substituted amide groups derived from the monomer of Formula I even when the latter copolymer is used with an auxiliary polyfunctional reagent, such as formaldehyde or a condensate of formaldehyde, such as that with melamine. For example, in the bonding of a non-woven fabric, the application of an acrylamide- or a methacrylamide-containing copolymer (containing no methylol groups) in conjunction with free formaldehyde, other conditions being the same, does not produce products having the laundering-resistance and dry-cleaning resistance obtained with the copolymers of the present invention. The extent of cure can conveniently be determined by testing a non-woven fabric bonded with the copolymers for durability to home-laundering, commercial laundering, and dry-cleaning. The aqueous dispersions of the present invention are quite stable, being substantially unchanged on storage at 100° F. over periods of 3 to 8 months.

In the following examples, which are illustrative of the invention, the parts and percentages are by weight unless otherwise specifically indicated.

*Example 1.—Preparation of N-methylol-4-pentenamide*

In a flask was placed 312 grams (3.15 moles) of 4-pentenamide, 183 grams (5.82 moles available as HCHO) of paraformaldehyde (96%), 80 grams of methanol and 20 grams of 1 N methanolic potassium hydroxide. The reaction mixture was warmed to 60°–70° C. for several hours during which time it fused. The reaction mixture was cooled to oven temperature, 400 ml. of ether added, followed by cooling in an ice bath. N-methylol-4-pentenamide crystallized which was separated by filtration, 127 grams, M.P. 72–73°. Concentration of the filtrate afforded a residue from which additional N-methylol-4-pentenamide (139 grams, M.P. 70.5–72°) was obtained after recrystallization from ether. An analytical sample of N-hydroxymethyl-4-pentenamide had M.P. 73–74.5°.

*Analysis.*—Calculated percent $C_6H_{11}O_2N$: C, 55.8; H, 8.5; N, 10.9; $CH_2O$, 23.3. Found percent: C, 56.0; H, 8.8; N, 10.9; $CH_2O$, 23.5.

Example 2.—Preparation of N-methoxymethyl-4-pentenamide

In a flask was placed 85 grams (0.66 moles) of N-hydroxymethyl-4-pentenamide, 150 mls. (120 g.) of methanol and sufficient 12% hydrogen chloride in methanol to bring the solution to pH of 3.0. The reaction mixture was allowed to remain at room temperature overnight, neutralized with sodium bicarbonate, filtered and filtrate distilled at reduced pressure. There was collected 83 grams (88%) of N-methoxymethyl-4-pentenamide boiling at 122° C./4.3 mm. Hg to 120° C./3.9 mm. Hg, $n_D^{25}$ 1.4592, M.P. 13–14° C.

*Analysis.*—Calculated percent for $C_7H_{13}O_2N$: C, 58.72; H, 9.15; N, 9.78. Found percent: C, 58.94; H, 9.2; N, 9.52, 9.56.

Example 3.—(a) Preparation of N-butoxymethyl-4-pentenamide

In a flask was placed 198 grams (1.38 moles) N-methoxymethyl-4-pentenamide, 207 grams (2.8 moles) n-butanol and sufficient concentrated $H_3PO_4$ to bring the reaction mixture to pH 2.0–3.0. Methanol was distilled from the reaction mixture followed by neutralization to pH 8.0 with sodium methoxide. Distillation afforded 176 grams of crude product, boiling range 106° C./0.2 mm. Hg–130° C./0.25 mm. Hg. Redistillation gave N-butoxymethyl-4-pentenamide, 125 grams, boiling range of 116° C./0.5 mm. Hg to 123° C./0.6 mm. Hg, $n_D^{25}$ 1.4550.

*Analysis.*—Calculated percent for $C_{10}H_{19}O_2N$: C, 64.83; H, 10.34; N, 7.56. Found percent: C, 64.93; H, 10.36; N, 7.37.

(b) N-ethoxymethyl-4-pentenamide was prepared in essentially the same way as described in (a) except that the n-butanol was replaced by 130 g. of absolute ethyl alcohol.

(c) N-hexoxymethyl-4-pentenamide was prepared in the same way as in part (a) except the n-butanol was replaced by 285 grams of n-hexanol.

Example 4.—Preparation of N-octadecyloxymethyl-4-pentenamide

In a flask was placed 43 grams (0.30 mole) N-methoxymethyl-4-pentenamide, 54 grams (0.20 mole) 1-octadecanol, 80 moles of toluene and 5 drops of concentrated $H_3PO_4$. The flask was equipped with a short fractionation column and distillation head. On distillation 10.8 grams of methanol-toluene mixture was collected which was found to contain the theoretical yield of methanol. On cooling the reaction mixture, a crystalline product formed which was separated by filtration and washed with 75 mls. of toluene. Recrystallization from ethyl acetate afforded 53 grams of crystalline N-octadecyloxymethyl-4-pentenamide, M.P. 78–78.5° C.

*Analysis.*—Calculated percent for $C_{24}H_{47}O_2N$: C, 75.53%; H, 12.42%; N, 3.67%. Found percent: C, 74.79; H, 12.31; N, 4.15.

Example 5

An aqueous dispersion of a copolymer was obtained by the emulsion copolymerization at 60° C. of 98 parts butyl acrylate and 2 parts of N-butoxymethyl-4-pentenamide emulsified in 200 parts of water, in the presence of 0.5 parts of ammonium persulfate and 0.5 part sodium hydrosulfite, by 3 parts of an ethylene oxide condensate of a t-octylphenol containing about 40 oxyethylene units per molecule. A reaction temperature of 60° C. was maintained for 3 to 4 hours. The pH of the polymeric dispersion was adjusted to pH=10.0 with triethylamine.

Example 6

(a) An aqueous dispersion of an emulsion copolymer of 45 parts of vinyltoluene, 53 parts of ethyl acrylate, and 2 parts of N-methylol-4-pentenamide also was prepared as in Example 5.

(b) Forty parts of the dispersion obtained in Example 5 was admixed with 10 parts of the mixture described in part (a) hereof. The polymer dispersion thus obtained was applied to paper products as follows:

Pieces of 20-mil chipboard (bakery board coated on one side) were roller-coated on the chip side with the polymer dispersion so as to provide a coating of 3 to 4 pounds of dispersion solids per thousand square feet of chipboard. Pieces of kraft bag paper and wallpaper were treated in the same manner. The coatings dried rapidly at 210° F. They were resistant to oils, fats, and greases. They repelled water and, when exposed to sunlight for long intervals of time, they did not discolor or pick up dirt and soil.

Example 7

A series of asbestos-cement sheets was sprayed with a mixture composed of 40 parts of the polymer dispersion prepared in Example 5, 10 parts of water, and 10 parts of the polymer dispersion prepared in Example 6 (a). One and one-half to 2.5 grams of resin solids per square foot was applied. The sheets were then dried for 16 hours at 95° C.

Sheets so coated may be stacked to a height of 2 to 3 feet without evidencing blocking. These sheets repelled water and, after outdoor exposure, were essentially unchanged in appearance. They showed no efflorescence, collected no dirt, and evidenced no fading; whereas uncoated shingles or shingles containing styrene in the coating appeared faded, dirty, and somewhat lighter in color.

White shingles and siding sheets of asbestos-cement type were obtained in the same way except that there was included in the aqueous coating composition a mixture of pigments consisting of 50% by weight of titanium dioxide, 25% of zinc sulfide, and 25% of blanc fixe (barium sulfate) pasted in water with 0.5% on the weight thereof of the ammonium salt of the half amide of a 1:1 mole ratio diisobutylene/maleic anhydride copolymer. The amount of pigment mixture used is 75 parts per 100 parts by weight of copolymer weight.

Example 8

(a) An aqueous dispersion containing 45% by weight of an emulsion copolymer of about 98% of ethyl acrylate and 2% of N-methoxymethyl-4-pentenamide was prepared by emulsion copolymerization as by the procedure of Example 5.

(b) A carded web of viscose rayon fibers, 2 denier, 1.5 inch length, weighting about 0.5 oz./sq. yd. was padded through the polymer dispersion obtained in part (a) to provide an 125% wet pickup. After air-drying, the treated "non-woven" web was heated at 300° F. for five minutes. The resulting bonded web was quite flexible and soft and withstood laundering without noticeable deterioration in an automatic washer employing ¼ cup of Tide in 15 gallons of water at 140° F. The fabric also withstood dry-cleaning without deterioration in a cleaning fluid formed of three gallons of carbon tetrachloride, one ounce of water, and 4.5 grams of the sodium salt of dicapryl sulfosuccinate. The dry-cleaning was effected in a portable agitator type of washer for a period of 30 minutes.

The bonded fabric was also bleached and scorched according to the AATCC test for "damage caused by retained chlorine" (69–1958). No discoloration of the fabric occurred as a result of this treatment.

(c) The resin dispersion obtained in part (a) hereof was diluted to a 5% concentration of the resin content and ½% of ammonium chloride was added and applied to a wool flannel, 2/2 right hand 45" twill, 55 x 44; S-twist in ends, Z in picks. After drying 10 minutes at 240° F., followed by curing for 10 minutes at 300° F., it was found that the proportion of copolymer applied to the fabric was about 3½% of the weight of the fabric. The shrinkage of the treated fabric after the five-hour wash described hereinabove was 3%. The untreated control shrank 36% after such a wash.

Example 9

The procedure of Example 8, parts (a) and (c), was repeated using a copolymer of 95.5% of ethyl acrylate and about 4.5% of N-octadecyloxymethyl-4-pentenamide. The product was water-repellent, resistant to drycleaning and survived ten cycles of washing under the conditions of Example 8.

Example 10

(a) An aqueous dispersion containing 46% by weight of an emulsion copolymer of about 1% of methacrylic acid, 2% of N-methoxymethyl-4-pentenamide of Formula I in which $n$ had an average value of about 1.2, 10% methyl methacrylate, and 87% of methyl acrylate was prepared by emulsion polymerization as in Example 5. The dispersion was adjusted to a pH of 9 by ammonium hydroxide and was resistant to breaking on mechanical agitation.

(b) There were mixed and ground on a roller mill 266.2 parts of titanium dioxide, 76.0 parts of lithopone, 51.5 parts of mica, 80.7 parts of silica, 6.8 parts of the ammonium salt of the half-amide of a 1:1 mole ratio diisobutylene/maleic anhydride copolymer, 7.2 parts of diethylene glycol, and 189.5 parts of water. After this mixture had been ground to a smooth, uniform paste, it was mixed with 516.0 parts of the dispersion of interpolymer, which was prepared in part (a). When the parts used are pounds, this formula yields 100 gallons of a white flat paint. It weighs 11.96 pounds per gallon, contains 59.6% of non-volatile matter, has a pigment to binder ratio of 2:1, and has a pigment volume concentration of 36%.

This paint is characterized by being tolerant to freezing, being stable on mechanical working, on prolonged storage, and against traces of iron which are encountered from imperfections in the lining of paint cans, and being readily applied by brush or roller. It may also be applied by knifing, dipping, or spraying. There is no objectionable odor. The applied coatings dry rapidly. They permit recoating almost immediately after drying. The paint films have excellent adhesion, rapidly become scrub-resistant and cleanable, and retain their color.

Example 11

An aqueous base paint was prepared as in Example 10 from a 46% aqueous latex prepared as in Example 5 of a copolymer of 1.5% methacrylic acid, 2.5% acrylamide, 2% of N - methoxymethyl - 4 - pentenamide, 25% acrylonitrile, and 69% of ethyl acrylate. The paint had relatively little odor and was stable on storage at 100° F. for several months, whereas a similar product obtained from a copolymer in which the 2.5% acrylamide was entirely replaced by 2.5% of N - methylolacrylamide was less stable to storage and has a decidedly objectionable odor.

Example 12

A mixture of 4.2% of N - hexoxymethyl - 4 - pentenamide, 20% of styrene, and 75.8% of n-butyl acrylate was emulsion copolymerized as in Example 5 at a concentration of 42% and using 1%, on the weight of monomers, of bromotrichloromethane as a chain-transfer agent. Then, 100 parts of the dispersion obtained was mixed with 100 parts of zinc oxide dispersed in 150 parts of water by 5 parts of an ammonium salt of a hydrated copolymer of maleic anhydride and diisobutylene. The resulting composition was useful as a quick-tack adhesive for paper, leather, and textiles. After drying and curing the adhered lamina at 250° F. for five minutes, the bonded laminates were water-resistant.

Example 13

A mixture of 4.2% of N - ethoxymethyl - 4 - pentenamide, 30% of vinylidene chloride, 25% of 2 - ethylhexyl acrylate, and 40.8% of ethyl acrylate was emulsion copolymerized in Example 5 at a concentration of 45%. The dispersion (11 parts) was then mixed with 2.5 parts of a blue copper phthalocyanine pigment, 5 parts of a 1% aqueous solution of t - octylphenoxypolyethoxyethanol having about 10 oxyethylene units per molecule, and 15 parts of a 0.5% aqueous solution of sodium alginate and enough water to make 300 ml. of total dispersion.

A sample of 80 x 80 cotton percale was padded with one dip and one nip through the above dyeing composition. It was then framed, dried for 5 minutes at room temperature, and then heated for 10 minutes at 300° F., a good pigment-dyeing being thereby obtained.

Example 14

A water-base paint was prepared as in Example 10 (b) using a 45% copolymer latex made by emulsion polymerization of a mixture of 28 parts of vinyl acetate, 0.5 part of acrylic acid, 16 parts of N - methoxymethyl - 4 - pentenamide of Formula I in which $n$ had an average value of 0.8, and 55.5 parts of ethyl acrylate. The composition adhered well on panels of wood, steel, glass, concrete, and asbestos-cement siding and shingles. Durability of the coatings was improved by subjecting the coatings to the heat of a bank of infrared ray lamps.

Example 15

The polymer dispersion obtained in Example 8 (a) was diluted to 30% concentration. An impregnating paper obtained from a pulp beaten to a Canadian Freeness of 630 cc. having low wet-tensile strength (0.52 lb./inch width in machine direction and 0.38 lb./inch width in cross direction) and having a basis weight of 32 pounds was immersed in the 30% dispersion prepared above. After thorough impregnation, the sheet was passed between squeeze rollers to remove excess impregnant and dried in contact with a chromium-plated surface heated to a temperature of 300° F. over a period of 10 minutes. It was then conditioned overnight at 74° F. and 50% relative humidity. The product contained about 77% polymer based on dry fiber weight. The tensile strength and edge-tear strength were greatly increased. The saturated paper was resistant to solvents, such as methyl isobutyl ketone, toluene, and mixtures thereof. It was resistant to discoloration on prolonged heating, undergoing relatively small loss in brightness on heating for 8 hours at 115° C. Surprisingly, its tensile strength increased on exposure to ultraviolet light.

In using the polymers for saturating purposes, the most common papers to be saturated are those obtained from pulps having Canadian Freeness values of about 450 to 630 and the proportion of polymer on fiber may vary from 20 to 100% by weight of polymer, based on the weight of fiber.

Example 16

An aqueous dispersion prepared containing about 42% of a copolymer of about 36% of methyl methacrylate, 3.5% of N - butoxymethyl - 4 - pentenamide, and 60.5% of ethyl acrylate was applied for unifying a bibulous fibrous backing for masking tape and for backing automobile upholstery with excellent results. The amount of polymer applied was 45% on the weight of fiber in the case of the masking tape and 15% in the case of the fabric backing. Drying and curing were carried out by passing the tape through an oven at 250° F., the time of passage being about 3 minutes.

Example 17

A cotton printcloth fabric (80 x 80) weighing 4 oz./sq. yd. was padded with an aqueous solution containing 1% N - methylol - 4 - pentenamide (NMPAm) and 0.2% of the hydrochloride of 2 - amino - 2 - methyl - propanol-1. The impregnated fabric was squeezed between rollers to provide a 100% pick-up. After squeezing, the impregnated fabric was supported on a frame and cured in a well-ventilated oven at 300° F. for 3½ minutes. The cured fabric was then washed in hot water containing 0.2% sodium nitrite and rinsed in cold water. The washed fabric was then hung on a line to dry. The fabric thus obtained was padded through a 0.5% solution of ammonium persulfate in water, cured at 300° F. for 3½ minutes, washed and then dried in air. The dry crease-recovery was then determined on the dried fabric and found to be about 130° as compared to 70° for the untreated fabric.

*Example 18*

A cotton fabric (80 x 80) was padded with a solution containing 0.5% ammonium persulfate and 20% NMPAm, framed, cured at 300° F. for 3½ minutes, washed and line-dried as in Example 17. A dry crease-recovery angle of 135° was obtained as compared to a 75° angle of the control fabric. Similar results are obtained when the NMPAm is replaced with a stoichiometric equivalent of N-methoxymethyl-4-pentenamide.

Changes and variations may be made in the foregoing description without departing from the spirit and scope of the invention as described and claimed herein. Instead of the N - methylol and N - alkoxymethyl derivatives of 4 - pentenamide, the corresponding derivatives of 3-butenamide or of 5-hexenamide may be used.

I claim:

1. A compound, or mixture of compounds, of the formula

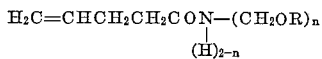

wherein R is selected from the group consisting of H and alkyl having 1 to 18 carbon atoms, and $n$ is a number having an average value of about 0.8 to 2.0.

2. N-methylol-4-pentenamide.
3. N-methoxymethyl-4-pentenamide.
4. N-butoxymethyl-4-pentenamide.
5. A thermosettable addition polymer of a compound, or mixture of compounds, of the formula

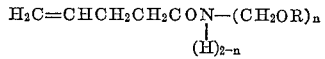

wherein R is selected from the group consisting of H and alkyl having 1 to 18 carbon atoms, and $n$ is a number having an average value of about 0.8 to 2.0.

6. A thermosettable addition copolymer of ethylenically unsaturated molecules comprising at least 0.25% by weight of at least one compound of the formula

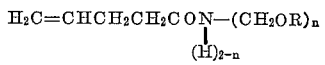

wherein R is selected from the group consisting of H and alkyl having 1 to 18 carbon atoms, and $n$ is a number having an average value of about 0.8 to 2.0, and at least one other copolymerizable ethylenically unsaturated monomer.

7. A thermosettable addition copolymer of monoethylenically unsaturated molecules comprising 0.25 to 10% by weight of at least one compound of the formula

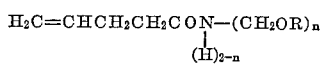

wherein R is selected from the group consisting of H and alkyl having 1 to 18 carbon atoms, and $n$ is a number having an average value of about 0.8 to 2.0, and at least one other copolymerizable monoethylenically unsaturated monomer.

8. An addition copolymer of about 0.25 to 10% by weight of N - methylol - 4 - pentenamide and about 90 to 99.75% by weight of at least one other copolymerizable monoethylenically unsaturated monomer.

9. An addition copolymer of about 0.25 to 10% by weight of N - methoxymethyl - 4 - pentenamide and about 90 to 99.75% by weight of at least one other copolymerizable monoethylenically unsaturated monomer.

10. An addition copolymer of about 0.25 to 10% by weight of N - butoxymethyl - 4 - pentenamide and about 90 to 99.75% by weight of at least one other copolymerizable monoethylenically unsaturated monomer.

11. As an article of manufacture, a fibrous material carrying thereon in thermoset, heat-cured condition a deposit of a thermosettable addition copolymer of monoethylenically unsaturated molecules comprising 0.25 to 10% by weight of at least one compound of the formula

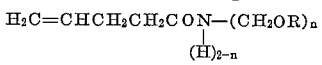

wherein R is selected from the group consisting of H and alkyl having 1 to 18 carbon atoms, and $n$ is a number having an average value of about 0.8 to 2.0, and at least one other copolymerizable monoethylenically unsaturated monomer.

12. As an article of manufacture, a fibrous material carrying thereon in thermoset, heat-cured condition a deposit of an addition copolymer of about 0.25 to 10% by weight of N - methylol - 4 - pentenamide and about 90 to 99.75% by weight of at least one other copolymerizable monoethylenically unsaturated monomer.

13. As an article of manufacture, a non-woven fabric in which fibers are bonded by 20% to 150% by weight, based on the weight of fibers in the fabric, of a heat-cured, solvent-resistant deposit of a thermosettable addition copolymer of monoethylenically unsaturated molecules comprising 0.25 to 10% by weight of at least one compound of the formula

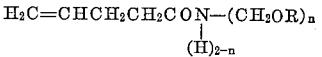

wherein R is selected from the group consisting of H and alkyl having 1 to 18 carbon atoms, and $n$ is a number having an average value of about 0.8 to 2.0, and at least one other copolymerizable monoethylenically unsaturated monomer.

14. As an article of manufacture, a non-woven fabric in which fibers are bonded by 5% to 150% by weight, based on the weight of fibers in the fabric, of a heat-cured, solvent-resistant deposit of an addition copolymer of about 0.25 to 10% by weight of N - methylol - 4 - pentenamide and about 90 to 99.75% by weight of at least one other copolymerizable monoethylenically unsaturated monomer.

References Cited by the Examiner

UNITED STATES PATENTS

| | | | |
|---|---|---|---|
| 2,760,977 | 8/1956 | Feuer et al. | 260—561 |
| 3,079,434 | 2/1963 | Christenson et al. | 260—561 |
| 3,161,672 | 12/1964 | Zachry et al. | 260—561 |

JOSEPH L. SCHOFER, *Primary Examiner.*

W. HOOVER, *Assistant Examiner.*